Figure 1:
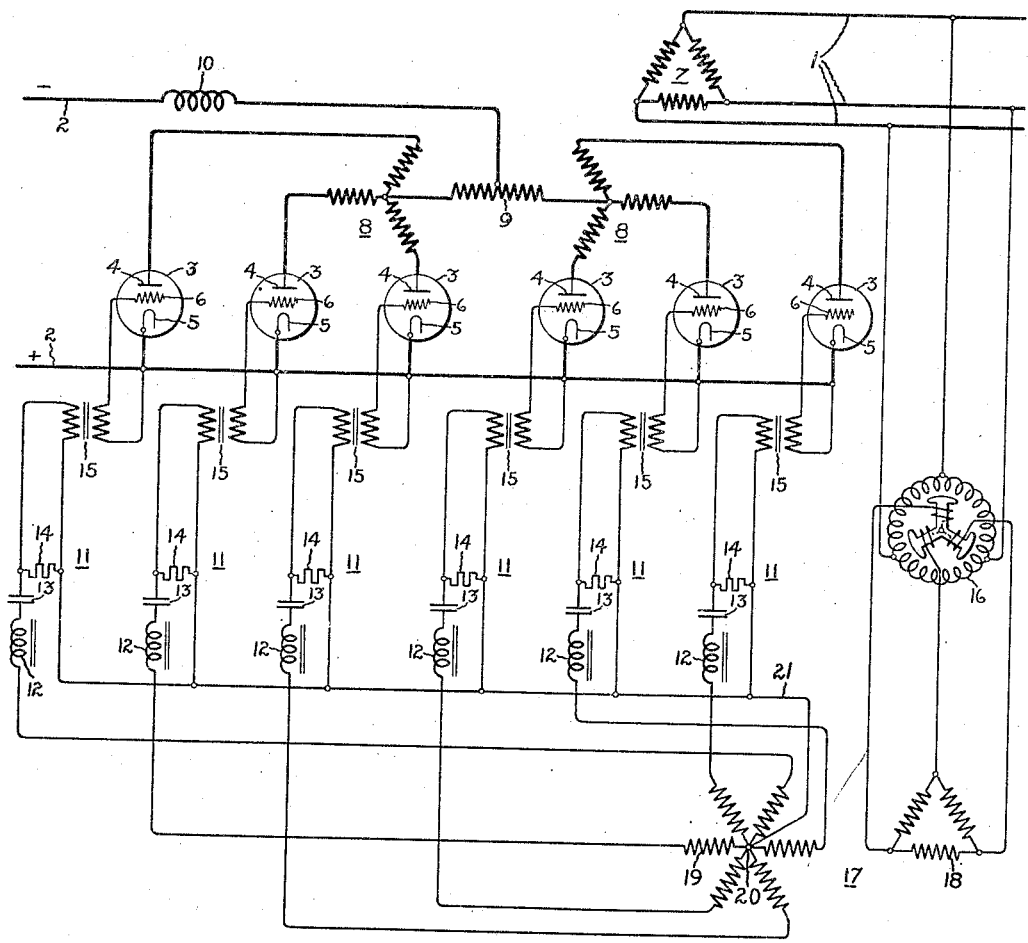

Nov. 15, 1938.  C. G. SUITS  2,137,148
ELECTRIC VALVE CIRCUITS
Filed Jan. 2, 1936  3 Sheets-Sheet 2
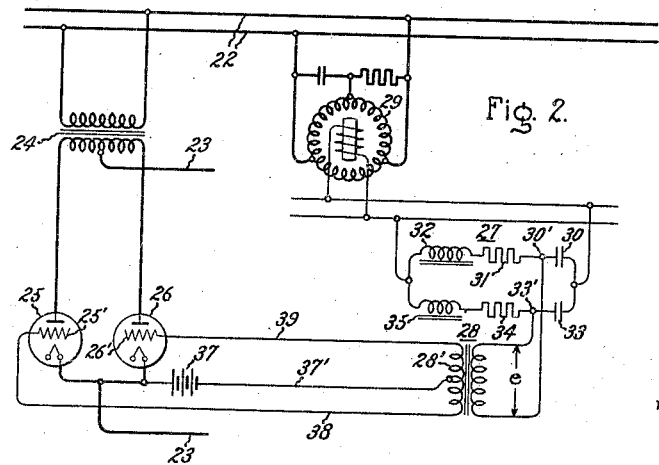
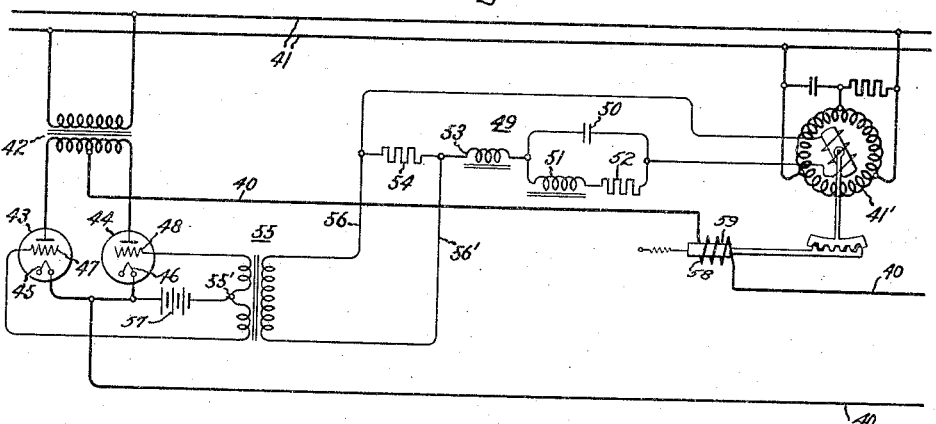
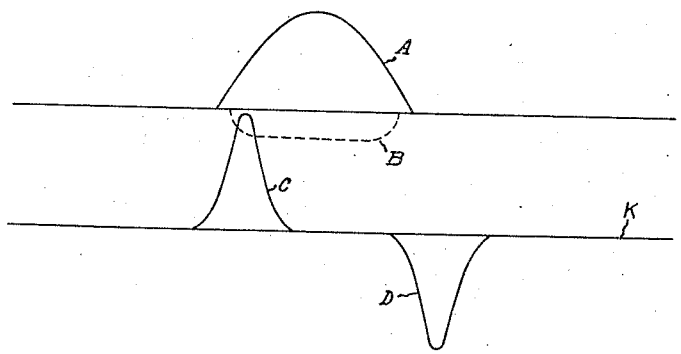
Inventor:
Chauncey G. Suits,
by Harry E. Dunham
His Attorney.

Nov. 15, 1938.  C. G. SUITS  2,137,148
ELECTRIC VALVE CIRCUITS
Filed Jan. 2, 1936   3 Sheets-Sheet 3

Inventor:
Chauncey G. Suits,
by Harry E. Dunham
His Attorney.

Patented Nov. 15, 1938

2,137,148

UNITED STATES PATENT OFFICE 2,137,148

ELECTRIC VALVE CIRCUITS

Chauncey G. Suits, Schenectady, N. Y., assignor to General Electric Company, a corporation of New York Application January 2, 1936, Serial No. 57,203

11 Claims. (Cl. 175—363)

My invention relates to electric valve circuits and more particularly to excitation circuits having non-linear or ferro magnetic resonance characteristics for controlling electric valves.

It is well known in the art that when a capacitance of proper value is connected in series with an inductance having a closed magnetic core and a source of alternating electromotive force of constant frequency, the current in the circuit varies in a non-linear relation to the impressed voltage. That is, as the voltage in the circuit is gradually increased the current increases in a substantially linear relation with the voltage until a certain critical value of voltage is reached. As this value of voltage at which saturation of the inductance takes place, is approached, the inductance resonates with the capacitance to effect a sudden increase in the current. As the electromotive force is still further increased, the current again increases in a substantially linear relation with respect to the impressed voltage. Circuits of this nature are said to have the property of non-linear, or ferro-magnetic resonance.

In electric valve circuits, particularly circuits employing electric valves of the vapor electric discharge type, it is frequently desirable to excite the electric valves by using a voltage having a peaked wave form or a voltage of rectangular wave shape having a substantially perpendicular wave front to assure reliable and precise excitation of the electric valves. There has been indicated a need for apparatus to supply voltages of suitable wave form and which will perform this function by using only apparatus of simple arrangement and operation.

An object of my invention is to provide improved excitation circuits for electric valves of the gaseous or high vacuum type.

Another object of my invention is to provide improved excitation circuits for electric valves which will supply a voltage of peaked wave form or a voltage having a substantially perpendicular wave front to the control members of the electric valves and which will perform this function in a simple and reliable manner.

A further object of my invention is to provide improved excitation systems for electric valve translating apparatus in which voltages of suitable wave form are supplied to render the valves conductive in a predetermined sequence.

In accordance with the illustrated embodiments of my invention, I provide excitation circuits for electric valves of the vapor electric type which utilize the nonlinear or ferro-magnetic resonance characteristics of an electric circuit. These excitation circuits may be of the series type, series-parallel type, or the bridge type, or a combination of these arrangements. In these various arrangements a self-saturating inductance comprising a closed ferro-magnetic circuit is employed. By utilizing the self-saturating characteristic of the inductance, a voltage of peaked wave form or a voltage of substantially perpendicular wave front may be obtained to control the conductivity of vapor electric valves with the desired precision and reliability. By the employment of a number of ferro-magnetic non-linear circuits and associated alternating current supply sources and phase shifting and voltage biasing means, I have provided excitation circuits for controlling translating apparatus using a number of electric valves and by means of which the various electric valves may be rendered conductive in any predetermined sequence.

For a better understanding of my invention, together with other and further objects thereof, reference may be had to the following description taken in connection with the accompanying drawings, and its scope will be pointed out in the appended claims.

Figure 7:
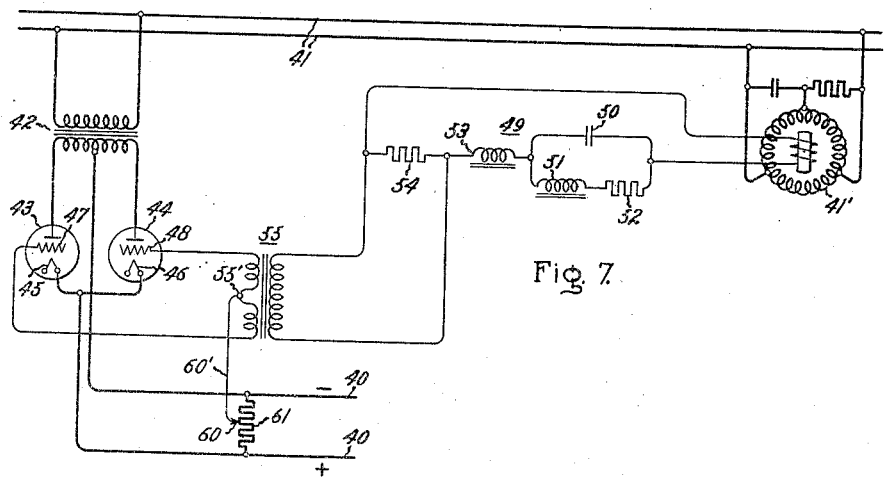
Figure 8:
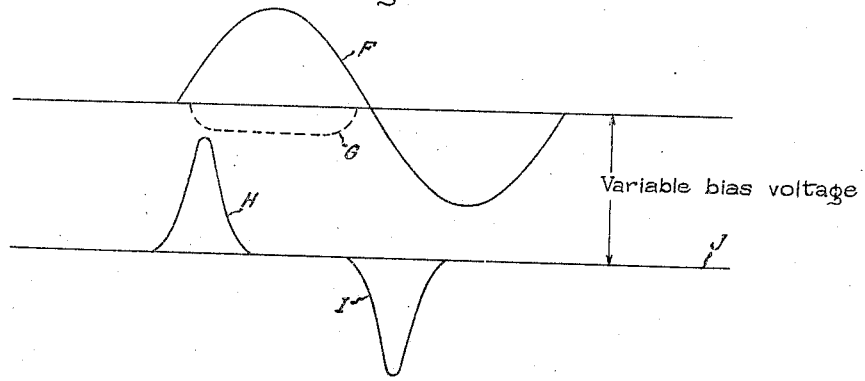
Figure 9:
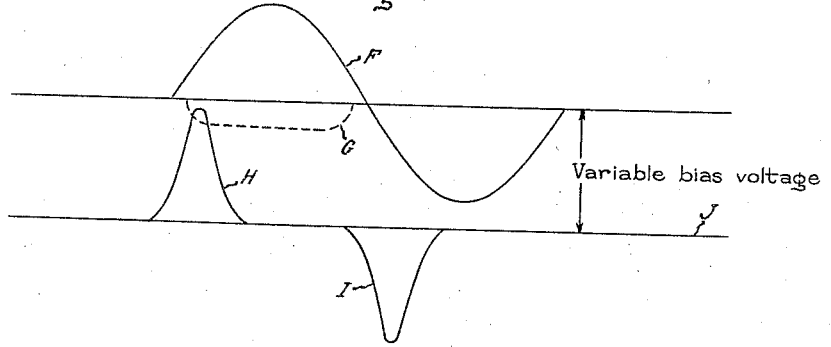

In the drawings, Fig. 1 illustrates diagrammatically an embodiment of my invention utilizing a series non-linear resonant circuit as applied to an electric valve translating circuit for transmitting energy between a three phase alternating current supply circuit and a direct current circuit. Fig. 2 diagrammatically illustrates another embodiment of my invention employing a network or bridge type of non-linear resonant circuit as applied to an electric valve system for controlling the conductivity of the vapor electric valves used in the translating circuit, Figs. 3 and 4 represent certain operating characteristics of the non-linear resonant control circuit of Fig. 2. Figs. 5 and 7 diagrammatically represent other embodiments of my invention employing non-linear resonant circuits of the series-parallel type for controlling the conductivity of an electric translating circuit employing vapor electric valves and by means of which automatic control of an associated electric circuit may be obtained. Fig. 6 and Figs. 8 and 9 represent certain operating characteristics of the embodiments of my invention shown in Figs. 5 and 7, respectively.

Referring now to Fig. 1 of the drawings in which my invention is diagrammatically shown as applied to an arrangement for transmitting energy between an alternating current circuit 1 and a direct current circuit 2, through electric valve 3, preferably of the vapor electric type, having anodes 4, cathodes 5 and control electrodes 6, and a transformer 7 having secondary windings 8. The electric valves 3 may be connected in the translating circuit in a manner well known in the art; that is, a double Y-connection may be employed in which the secondary windings 8 are displaced sixty electrical degrees relative to each other and the neutral points of the secondary windings 8 are connected to one side of the load circuit 2 through an inter-phase reactor 9 and a smoothing reactor 10. The cathodes 5 of electric valves 3 are connected to the other side of the load circuit 2.

In order to supply a voltage of satisfactory wave form to the control electrodes 6 of electric valves 3, non-linear resonant circuits 11 are employed. The non-linear circuits 11 each comprises a saturable inductance 12, a capacitance 13 and a resistance 14 connected in series across a source of control potential hereinafter described. The inductance 12 may be self-saturating or may be saturated by auxiliary means in a manner described and claimed in Patent No. 1,921,787 granted August 8, 1933 on my application and assigned to the assignee of the present application. Non-linear resonant circuits are characterized by having a critical resonance voltage when the frequency of the voltage impressed thereacross remains substantially constant. Connected in parallel with the resistances 14 are suitable inductive devices or transformers 15, the secondary or output windings of which are connected to the cathodes 5 and the control electrodes 6 of the associated electric valves 3. The various non-linear excitation circuits 11 are energized from the alternating current circuit 1 through a phase shifting arrangement 16 and a transformer 17 having primary windings 18 and secondary windings 19. One terminal of each of the secondary windings 19 of transformer 17 is connected to form a neutral point 20 which is connected to one side of each of the various excitation circuits 11 by means of a conductor 21. The other terminal of each of the various secondary windings 19 is connected to the other side of the associated excitation circuit 11. In the particular arrangement diagrammatically shown in the drawings sinusoidal potentials substantially sixty electrical degrees out of phase are obtained by means of transformer 17 and impressed upon the various excitation circuits 11.

The operation of the electric valve circuit diagrammatically illustrated in Fig. 1 of the drawings may be explained by considering the circuit when energy is being transmitted from the alternating current circuit 1 to the direct current load circuit 2. By means of the transformer 17 and the individual excitation circuits 11, the electric valves 3 are rendered conductive in a predetermined sequence, preferably in an order corresponding to the order of phase rotation of the positive voltages impressed upon the anodes 4 of the various electric valves 3. Sinusoidal voltages are impressed upon the individual non-linear excitation circuits 11 by means of the transformer 17. As the voltage impressed upon any one of the individual excitation circuits 11 increases, the current in that circuit will vary in a substantially linear relation with the voltage until a critical value of voltage is attained. This critical value of voltage is determined by the value of the capacitance 13 and the value of current at which the inductance 12 becomes saturated and resonates with the capacitance 13. At this point the non-linear circuit 11 will be in series resonance, resulting in a rapid increase in the current which flows through the circuit. As the voltage impressed upon the excitation circuit is still further increased, the current again increases in a substantially linear relation with respect to the impressed voltage. This non-linear volt-ampere characteristic is utilized to obtain a voltage of peaked wave form to excite or render conductive the electric valves 3. The transformers 15 which may be energized in response to an electrical condition, such as the voltage appearing across the resistance of the non-linear circuit, are employed to impress the desired peaked voltage upon the control electrode or member 6 of electric valves 3.

It should be understood that the peaked voltage of transformers 15 occasioned by the non-linearity of the excitation circuits 11 will occur above certain critical values of the voltage impressed upon the circuits. Any conventional phase shifting arrangement 16 may be utilized to adjust the phase of the voltages appearing across the secondary windings 19 of transformer 17 and to obtain thereby an adjustment of the point in the positive half cycle of anode-cathode potential at which the peaked voltage is impressed upon the associated control members 6 of electric valves 3.

Referring now to Fig. 2 of the drawings, another embodiment of my invention using the network type of non-linear resonant circuit is employed to control the conductivity of vapor electric valves. In the particular arrangement, the electric valve translating circuit is employed to transmit energy from the alternating current circuit 22 to the direct current circuit 23. A transformer 24 and electric valves 25 and 26, preferably of the vapor electric type, having control electrodes 25' and 26' are employed to furnish impulses of unidirectional current to the direct current circuit 23 in the manner well understood by those skilled in the art. To control the conductivity of electric valves 25 and 26 and to provide a voltage of substantially perpendicular wave front, a network or bridge circuit 27 is employed, which is of the type disclosed and claimed in Patent No. 1,921,788, granted August 8, 1933 on my application and assigned to the assignee of the present application. The bridge circuit 27 may be energized from the alternating current circuit 22 through any conventional phase shifting arrangement such as the rotary phase shifting device 29.

The network circuit 27 shown in the form of a Wheatstone bridge includes one circuit comprising a serially connected capacitance 30, a resistance 31 and a self saturating inductance 32. Another circuit connected in parallel with the first circuit comprises a capacitance 33, a resistance 34 and a self-saturating inductance 35. The value of the capacitance 30 is smaller than the value of the capacitance 33, and the inductance 32 is provided with a slightly larger number of turns than the inductance 35 so that the inductance 32 saturates at a lower current than the current required to saturate inductance 35. The non-linear network 27 in the embodiment of my invention shown in Fig. 2 is used to control the conductivity of electric valves 25 and 26 and is energized from the phase shifting device 29 to obtain voltages substantially 180 electrical degrees out of phase with each other. The voltage appearing across points 30' and 33' of the non-linear network 27 is impressed upon the primary winding of transformer 28. The control electrodes 25' and 26' of electric valves 25 and 26 respectively are connected to secondary windings 28' of transformer 28 by means of conductors 38 and 39, respectively. A suitable voltage biasing means, such as a battery 37, is employed to impress a negative potential upon the control electrodes 25' and 26' through conductor 37' and the secondary windings 28'.

During the positive half cycle of potential impressed upon the parallel circuits of bridge circuit 27 by the phase shifting device 29, a voltage having a substantially perpendicular wave front will appear between the points 30' and 33' and, similarly, during the negative half cycle of the potential impressed upon this bridge circuit a similar voltage of opposite polarity will appear between the points 30' and 33'. Of course, the phase relation of these voltages relative to the anode-cathode potential impressed upon the various electric valves may be varied by means of the phase shifting device 29.

It should be understood that where the non-linear network of the bridge type is energized from a circuit in which the voltage varies over a considerable range, it will be necessary to choose the constants of the non-linear circuits so that the voltage impressed upon these circuits is considerably above the non-linear critical resonance region. The constants of these non-linear circuits may be chosen so that the voltage appearing between the points 30' and 33' has a rectangular wave shape with a substantially perpendicular wave front. The bridge network may be adjusted to supply a voltage of square wave front of constant magnitude which is independent of supply voltage.

The operation of my invention diagrammatically shown in Fig. 2 may be best explained by considering the circuit when energy is being transmitted from the alternating current circuit 22 to the direct current circuit 23. In the manner well understood by those skilled in the art, the electric valves 25 and 26 will be rendered conductive alternately to conduct unidirectional current to the direct current circuit 23. Electric valves 25 and 26, being of the vapor electric type, may be maintained non-conductive as is well understood by impressing upon the control electrodes 25' and 26' a voltage having a value less than the critical control voltage for the particular type of electric valve employed. The voltage biasing means 37 is used to impress upon the control electrodes a voltage to maintain them non-conductive until a suitable positive voltage is impressed upon the various control electrodes by means of the non-linear bridge or network 27. The non-linear network 27 is arranged so that the voltage of tap 33' is alternately positive and negative relative to the voltage of tap 30' during each cycle of applied potential to impress alternately positive voltages of substantially perpendicular wave front upon the control electrodes 25' and 26', thereby rendering ineffective the negative bias voltage impressed in the circuit by the battery 37.

Referring to the operating characteristics represented by the curves of Fig. 3 in connection with the operation of the non-linear parallel circuits of Fig. 2, curve $a$ represents the R. M. S. volt-ampere characteristics for the upper parallel branch and the curve $b$ represents the volt-ampere characteristic for the lower branch. The curves $a$ and $b$ also represent the R. M. S. voltages appearing across the capacitances 30 and 33, respectively. The vertical portions of these curves represent the resonance regions which occur at substantially the same value of applied voltage. It will be noted that within the linear region above the resonance region, the current in the upper parallel branch and hence the current flowing through the capacitance 30 will be greater than the current in the lower parallel branch. This difference in operating characteristics of these two parallel branches is due to the difference in values of the capacitances 30 and 33 and the inductances 32 and 35. Curve $c$ of Fig. 4 represents the difference voltage $e$ in R. M. S. values appearing between the points 30' and 33' as a function of the applied voltage and is the voltage which is impressed upon the control electrodes of the electric valves 25 and 26 by means of transformer 28.

If the voltage of alternating current circuit 22, and hence the voltage impressed upon the non-linear network 27, is substantially constant, the constants of the parallel non-linear circuits may be chosen so that these circuits operate within the resonance region. The voltages appearing across the capacitances 30 and 33 will be rectangular in wave shape and the differences of these voltages will also be substantially rectangular in wave shape. However, if the voltage of the alternating current circuit 22 varies within a considerable range, it may be desirable to choose the constants for the non-linear parallel circuits so that the impressed voltages lie considerably above the resonance region. Referring to the curves of Figs. 3 and 4, it will be noted that within the linear region above the non-linear resonance region, the voltage appearing between the points 30' and 33' will have a substantially constant value independent of impressed voltage. The wave form of this voltage within this non-linear region above the resonance region will be substantially rectangular and will have a wave form of constant shape independent of applied voltage.

It should be understood that the voltage appearing between points 30' and 33' in the network 27 will have a rectangular wave shape when considering instantaneous values and that the wave front will be substantially perpendicular. This particular characteristic is highly desirable in connection with the excitation of vapor electric valves, since it provides a means for obtaining precise and accurate excitation of these valves.

Fig. 5 of the drawings diagrammatically illustrates another embodiment of my invention in which the conductivity of electric valves is controlled by means of a non-linear resonant circuit of the series-parallel type and in which means are provided for automatically controlling the conductivity of associated electric valves in response to the power transmitted. Unidirectional current is transmitted to the direct current load circuit 40 from the alternating current circuit 41 by means of a transformer 42 and electric valves 43 and 44, preferably of the vapor electric type, and having cathodes 45 and 46 and control electrodes 47 and 48, respectively. A non-linear resonant circuit 49 of the series-parallel type is used to control the conductivity of electric valves 43 and 44. This circuit is of the type disclosed and claimed in United States Letters Patent No. 1,877,703, granted September 13, 1932, and Patent No. 2,021,753, granted November 19, 1935, and both assigned to the same assignee as the present application. This circuit may be energized from the alternating current circuit 41 through a suitable phase shifting arrangement 41'. The rotary phase shifting device 41' is provided with means for shifting the phase of the voltage impressed upon the series-parallel circuit 49. Any suitable manual or automatic operating means may be used but I have shown, by way of example, automatic means comprising a current responsive arrangement, such as the current responsive coil 58 and the spring biased associated plunger 59, which is used to control the rotary element of the phase shifting device 41' in response to the current flowing in the direct current circuit 40. The series-parallel circuit 49 includes a parallel circuit comprising a capacitance 50 connected in parallel with a serially connected self-saturating inductance 51 and a resistance 52. This parallel circuit is connected in series with the self-saturating inductance 53 and the resistance 54. The self-saturating inductance 51 is provided with a larger number of turns than the self-saturating inductance 53 so that the inductance 51 saturates at a higher voltage than the voltage at which the inductance 53 saturates. A transformer 55 energized in response to an electrical condition of the resistance 54, such as the voltage appearing across the resistance 54, and connected thereto by means of conductors 56 and 56' is used to impress upon the control electrodes 47 and 48 of electric valves 43 and 44, respectively, voltages of peaked wave form. A suitable voltage biasing means, such as a battery 57, is connected between midpoint 55' of transformer 55 and the cathodes of electric valves 43 and 44. The voltage appearing across the capacitance 50 may be utilized in those applications where it is desired to impress upon the various control electrodes of the electric valves a voltage of substantially rectangular wave form and having a substantially perpendicular wave front.

The general principle of operation of the embodiment of my invention diagrammatically illustrated in Fig. 5 is substantially the same as that described in connection with Figs. 1 and 2. The arrangement shown in Fig. 5 differs from that described above by utilizing a non-linear resonant circuit of the series-parallel type to provide a voltage of peaked wave form for controlling the conductivity of electric valves 43 and 44. Referring to the non-linear circuit 49, since the self-saturating inductance 51 is provided with a greater number of turns than the inductance 53, the inductance 53 will become saturated at a lower voltage than the voltage at which the inductance 51 saturates. As the voltage impressed upon the series-parallel circuit by the phase shifting device 41' increases over a range of relatively low values, the inductance 53 is unsaturated and the impedance of the inductance 53 is large; hence a large percentage of applied voltage is impressed across inductance 53. For low values of applied voltage the impedance of the inductance 53 is large. During the range of voltages in which a relatively high voltage is impressed across the inductance 53 the voltage impressed across the capacitance 50 is relatively small. Near the upper range of these relatively low voltages, the inductance 53 saturates, effecting thereby a decrease in its impedance. At this point the circuit operates in a manner similar to the single series resonance circuit described in connection with Fig. 1. The increase of current occasioned by this quasi-series resonance operation effects an increase in the potential impressed across the capacitance 50 and results in an increase in the impedance of the parallel path comprising capacitance 50, inductance 51 and resistance 52. The relatively high voltage coincident therewith effects saturation of the inductance 51 to establish this condition of parallel resonance in the parallel circuit and to cause desaturation of the inductance 53 and a decrease in the series current. It will be understood that over this range of applied voltages, the series current has increased rapidly to a relatively high value and upon further increase of applied voltage the series current has rapidly decreased. By suitable adjustment of the circuit constants the series current may be maintained at a constant value instead of decreasing with increasing applied voltage. The peaked wave form of the series current is utilized to obtain a peaked voltage by means of the resistance 54 to control the conductivity of electric valves 43 and 44. During the following half cycle, it should be understood that a similar voltage of opposite polarity will appear across the resistance 54.

A very desirable feature of the series-parallel circuit diagrammatically shown in Fig. 5 is the ability of this circuit to provide a voltage of constant peak value, phase displacement and wave form with considerable variation in the value of the voltage impressed upon the series-parallel circuit. I have found in practical cases that the voltage obtained by this circuit, that is, the voltage appearing across the resistance 54, remains fixed in magnitude, phase displacement and wave form when the voltage impressed upon the circuit varies as much as thirty per cent.

A further desirable feature of the series-parallel circuit represented in Fig. 5 is the inherent characteristic which makes it particularly adaptable to full wave rectifiers employing vapor electric valves where it is desirable to render the electric valves conductive at certain predetermined points during the positive half cycle of anode-cathode potential. By virtue of the above described inherent characteristic with which the circuit maintains an output voltage of constant phase displacement, magnitude, and wave form, the rectifying valves may be rendered conductive at precisely the same point of anode-cathode potential irrespective of considerable variation in anode-cathode potential impressed upon the series-parallel circuit. In those applications where it is deemed inexpedient to use a phase shifting arrangement, such as the device 41', and where it is desirable to obtain in full wave rectification, the series-parallel circuit of Fig. 5 may be employed with advantage since the maximum value of the voltage appearing across the resistance 54 lies substantially 90 electrical degrees in advance of the maximum or peak value of the anode-cathode potential or the potential impressed upon the series-parallel circuit. This voltage may, therefore, be utilized for excitation of the electric valves at the beginning or zero point of each positive half cycle of anode-cathode potential.

The voltage appearing across the capacitance 50 is rectangular in shape and has a wave front which is substantially perpendicular. The value of this rectangular voltage appearing across the capacitance 50 and the rate at which it increases may be varied by the choice of proper circuit constants.

Certain operating characteristics of the apparatus shown in Fig. 5 are illustrated in Fig. 6. The curve A represents a positive half cycle of anode-cathode potential impressed upon one of the electric valves, for example, electric valve 43. The curve B represents the control characteristic for the particular valve employed and curves C and D represent the peak voltages appearing across the resistance 54. The angular displacement between the curves C and D and the control characteristic B may be controlled, of course, by the phase shifting device 41'. A bias voltage K is impressed upon the control electrodes by the battery 57. Voltages of peaked wave form represented by curves C and D are superimposed upon the bias voltage E. It will be understood that as the current in the direct current load circuit 40 varies, the current responsive element 58 will be effective to operate the phase shifting device 41' and to shift the phase of the peak voltages represented by curves C and D and to effect thereby a control of the voltage of the direct current circuit 40. As will be well understood by those skilled in the art, the period of conductivity of the electric valves 43 and 44 may be controlled by controlling the phase relationship of the voltages impressed upon the control electrodes and the voltages impressed between the anodes and the cathodes.

It should be understood that it is also possible to adjust the constants of the circuit 49 so that the peak current in the circuit is independent of the voltage within a certain range of applied voltage and also constant in magnitude and phase throughout a wide range of applied voltage.

Referring now to Fig. 7 of the drawings, a further modification of my invention is diagrammatically shown as applied to an electric valve system for transmitting energy between an alternating current circuit and a direct current circuit. A non-linear resonant circuit of the series-parallel type is provided to control the conductivity of the associated electric valves and additional means are associated with the non-linear circuit to render the non-linear circuit ineffective in response to a predetermined electrical condition of an associated electric circuit. The apparatus employed in the arrangement diagrammatically shown in Fig. 7 is substantially identical with that employed in the arrangement shown in Fig. 5 and corresponding elements have been assigned like reference numerals. The arrangement in Fig. 7 differs from that in Fig. 5 by providing a resistance 61 connected across the direct current circuit 40 and which is utilized to render conductive and non-conductive the electric valves 43 and 44 in response to voltage variations of the direct current circuit 40. By virtue of this arrangement, it will be understood that when the voltage of direct current circuit 40 is above a predetermined minimum value, electric valves 43 and 44 will be maintained non-conductive because of the relatively large negative bias voltage impressed upon the respective control electrodes. When the voltage of the direct current circuit 40 attains a predetermined minimum value or values below the minimum value, the negative bias voltage will be appreciably decreased to render effective the peaked voltage furnished by the non-linear circuit 49.

The general principle of operation of the modified embodiment of my invention as diagrammatically illustrated in Fig. 7 is substantially the same as that described in connection with Fig. 5. In the arrangement shown in Fig. 7, a means is shown for controlling the bias voltage impressed upon the control electrodes. This means, comprising a resistance 61 connected in parallel with the direct current load circuit 40, is responsive to the voltage of the direct current circuit 40, and may be utilized to render the valves conductive or non-conductive. If it be assumed that the electric valve translating system shown in Fig. 7 is arranged to supply direct current to the variable voltage direct current circuit 40, it will be understood that when the voltage of the direct current circuit exceeds a predetermined maximum value for which the resistance 61 is adjusted by means of the tap 60, the bias voltage will be increased to render ineffective the peak voltage furnished by the non-linear circuit 49.

Referring to Fig. 8, curve F represents the anode-cathode voltage applied to one of the electric valves, for example electric valve 43, and the curve G represents the control characteristic for the valve. Curves H and I represent the peak voltages of opposite polarity appearing across the resistance 54 and impressed upon the control electrodes 47 and 48 by means of the transformer 55. The variable bias voltage J, upon which are superimposed the peak voltages represented by curves H and I, is responsive to the voltage of the direct current circuit 40. As will be understood by those skilled in the art, vapor electric valves may be rendered conductive during the positive half cycle of anode-cathode potential by impressing on the control electrodes a potential more positive than the critical potential. In the circuit operating condition represented by the curves of Fig. 8, it is seen that the voltage of the direct current circuit 40 is greater than the predetermined maximum value and that the bias voltage impressed upon the control electrodes is of sufficient value to prevent the peak voltages represented by curve H from intersecting the control characteristic G. Under such an operating condition, the electric valves will be rendered non-conductive and no energy will be supplied to the direct current circuit 40 from the alternating current circuit 41. In Fig. 9 the operating characteristics of the apparatus are represented when the voltage of direct current circuit 40 decreases to a value less than the critical value for which the electric valve circuit is adjusted. In accordance therewith, the bias voltage J is decreased, effecting an application to the control electrodes of a voltage having a value more positive than the critical control characteristic. Under such condition the electric valve translating circuit will transmit energy from the alternating current circuit 41 to the direct current circuit 40.

Although the diagrammatic representations of my invention have been shown as applied to circuits for transmitting energy from alternating current circuits to direct current circuits, it should be understood that my invention in its broader aspects may be applied to systems for transmitting energy in either direction between alternating current circuits of the same or different frequencies or for transmitting energy in either direction between alternating and direct current circuits.

While I have shown and described my invention as applied to a particular system of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States, is:—

1. In combination, a supply circuit, a load circuit, electric valves for transmitting energy between said circuits, and means comprising a source of alternating current, a phase shifting device and individual non-linear resonant circuits associated with each of said valves for rendering said valves conductive in a predetermined sequence, each of said non-linear resonant circuits having a critical resonance voltage lying within the normal range of voltages applied to said resonant circuits.

2. In combination, a supply circuit, a load circuit, a plurality of electric valves for interconnecting said circuits, and an excitation circuit for controlling the conductivity of said valves comprising an inductive network having a plurality of windings and a neutral point, a plurality of individual circuits each being connected to said neutral point and to one of said windings and each of said individual circuits being associated with a control member of a predetermined one of said electric valves, said individual circuits each including a capacitance and a saturable inductance connected in series and having a non-linear volt-ampere characteristic for impressing in a predetermined sequence voltages of peaked wave form on the control members of said electric valves.

3. In combination, an alternating current supply circuit, a direct current load circuit, a full wave electric valve rectifying means for interconnecting said circuits comprising two electric valves each having a control member, and means comprising a non-linear resonant network of the bridge type for impressing on each of said control members a periodic voltage of substantially perpendicular wave front and having a phase displacement of substantially 180 electrical degrees relative to the voltage impressed on the other of said control members.

4. In combination, a supply circuit, a load circuit, electric valve means interconnecting said circuits, and means for controlling the conductivity of said electric valve means comprising a non-linear resonant network of the bridge type including two parallel connected circuits each comprising a serially connected capacitance, a resistance and a self-saturating inductance, said parallel circuits being arranged to be resonant at substantially the same critical value of voltage and being arranged to operate above said critical voltage to supply a voltage of rectangular wave shape of constant magnitude and wave form independent of variations in impressed voltage over a predetermined range.

5. In combination, an alternating current circuit, a direct current circuit, means for interconnecting said circuits comprising an electric valve having a control member, and means energized from said alternating current circuit comprising a non-linear resonant circuit of the series-parallel type including a parallel circuit having a capacitance and a saturable inductance arranged in parallel relationship and a saturable inductance connected in series with said parallel circuit for impressing on said control member a peaked voltage having a substantially constant magnitude, wave form and phase displacement relative to the voltage of said alternating current circuit for substantial variations in the voltage of said alternating current circuit.

6. In combination, an alternating current circuit, a direct current circuit, electric valve means interconnecting said circuits and having a control member, and a non-linear resonant circuit of the series-parallel type comprising a parallel circuit including a parallel-connected capacitance and a saturable inductance and a saturable inductance arranged in series relation with said parallel circuit for impressing on said control member a peaked voltage of substantially constant magnitude and wave form for substantial variations in the voltage of the alternating current circuit and having a maximum value approximately 90 electrical degrees in advance of the maximum value of the voltage of said alternating current circuit.

7. In combination, an alternating current supply circuit, a direct current load circuit, a full wave rectifier comprising two electric valves interconnecting said circuits and each having a control member, and means comprising a parallel circuit including a parallel-connected capacitance and a saturable inductance and a saturable inductance arranged in series relation with said parallel circuit for impressing on each of said control members a peaked voltage having a substantially constant magnitude, wave form and phase displacement relative to the voltage of said alternating current circuit for substantial variations in the voltage of said alternating current circuit.

8. In combination, an alternating current supply circuit, a load circuit, an electric valve interconnecting said circuits and having a control electrode, an excitation circuit comprising a non-linear resonant circuit energized from said alternating current circuit through a phase shifting device for impressing upon said control electrode a periodic voltage having a substantially perpendicular wave front, and means responsive to the power transfer between said supply circuit and said load circuit for controlling said phase shifting device to control the phase displacement of said periodic voltage relative to the voltage of said alternating current circuit.

9. In combination, an alternating current supply circuit, a load circuit, an electric valve interconnecting said circuits and having a control electrode, an excitation circuit comprising a non-linear resonant circuit for impressing upon said control electrode a voltage having a substantially perpendicular wave front, means comprising a phase shifting device for energizing said excitation circuit from said alternating current circuit and being arranged to permit phase adjustment of said periodic voltage relative to the voltage of said alternating current circuit, and means comprising a source of voltage for impressing a negative bias voltage upon said control electrode to render ineffective said periodic voltage in response to a predetermined electrical condition of said load circuit.

10. In combination, an alternating current supply circuit, a load circuit, an electric valve interconnecting said circuits and having a control electrode, an excitation circuit comprising a non-linear resonant circuit for impressing upon said control electrode a periodic voltage having a substantially perpendicular wave front, and means responsive to the voltage of said load circuit for impressing upon said control electrode a negative bias voltage to maintain said valve non-conductive when the voltage of said load circuit exceeds a predetermined value.

11. In combination, a supply circuit, a load circuit, a plurality of electric valves for interconnecting said circuits, and an excitation circuit for controlling the conductivity of said valves comprising an inductive network providing a plurality of sources of alternating potential, a plurality of individual circuits each being connected to a different one of said sources and each being associated with a control member of a predetermined one of said electric valves, said individual circuits each including a capacitance and a saturable inductance connected in series and having a non-linear volt-ampere characteristic for impressing in a predetermined sequence potentials of peaked wave form on the control members of said electric valves.

CHAUNCEY G. SUITS.